(12) United States Patent
Yahagi et al.

(10) Patent No.: US 9,784,146 B2
(45) Date of Patent: Oct. 10, 2017

(54) VALVE TIMING CONTROL DEVICE FOR INTERNAL COMBUSTION ENGINE

(71) Applicant: Hitachi Automotive Systems, Ltd., Hitachinaka-shi, Ibaraki (JP)

(72) Inventors: Yasuo Yahagi, Tokyo (JP); Mikihiro Kajiura, Hitachinaka (JP); Akinori Suzuki, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 131 days.

(21) Appl. No.: 14/774,463

(22) PCT Filed: Jul. 1, 2014

(86) PCT No.: PCT/JP2014/067494
§ 371 (c)(1),
(2) Date: Sep. 10, 2015

(87) PCT Pub. No.: WO2015/045542
PCT Pub. Date: Apr. 2, 2015

(65) Prior Publication Data
US 2016/0032795 A1 Feb. 4, 2016

(30) Foreign Application Priority Data
Sep. 26, 2013 (JP) ................................. 2013-200001

(51) Int. Cl.
*F01L 9/04* (2006.01)
*F01L 1/352* (2006.01)
(Continued)

(52) U.S. Cl.
CPC .................. *F01L 9/04* (2013.01); *F01L 1/34* (2013.01); *F01L 1/352* (2013.01); *H02K 5/148* (2013.01);
(Continued)

(58) Field of Classification Search
CPC ........ F01L 9/04; F01L 1/34; F01L 2009/0478
See application file for complete search history.

(56) References Cited

U.S. PATENT DOCUMENTS 4,818,960 A * 4/1989 Satoh ....................... H03H 7/01
174/536
6,580,194 B2 * 6/2003 Mizutani ............. H02K 11/026
310/239
(Continued)

FOREIGN PATENT DOCUMENTS

JP 11-44270 A 2/1999
JP 2002-165413 A 6/2002
(Continued)

OTHER PUBLICATIONS

International Search Report (PCT/ISA/210) dated Sep. 22, 2014, with English translation (four (4) pages).

*Primary Examiner* — Zelalem Eshete
(74) *Attorney, Agent, or Firm* — Crowell & Moring LLP

(57) ABSTRACT

The present invention provides a valve timing control device that can suppress a leakage of noise to the outside of the device and can improve reliability without needlessly increasing the volume occupied by the device. There is provided a valve timing control device for an internal combustion engine, including a driving rotary body to which rotational force from a crankshaft is transmitted, a driven rotary body, an intermediate rotary body, a speed reduction mechanism, an electric motor, and a housing, wherein: the electric motor rotates relative to the camshaft and the housing; the valve timing control device further includes a current application switching mechanism which is provided inside the housing and which includes brushes to switch current application to a coil of the electric motor, and feeding mechanisms which are provided between the housing and an external device and which include brushes to
(Continued)

apply a current from the external device to the current application switching mechanism; electromagnetic noise emission suppression means is provided on the power supply side of the brushes of the feeding mechanisms; and the brushes of these mechanisms are disposed apart from the rotational axis of the camshaft by substantially the same distance.

8 Claims, 7 Drawing Sheets

(51) Int. Cl.
    *H02K 5/14*       (2006.01)
    *H02K 5/22*       (2006.01)
    *F01L 1/34*        (2006.01)
    *H02K 7/14*       (2006.01)

(52) U.S. Cl.
    CPC ...... *H02K 5/225* (2013.01); *F01L 2009/0478* (2013.01); *F01L 2101/00* (2013.01); *F01L 2250/02* (2013.01); *F01L 2810/04* (2013.01); *F01L 2820/032* (2013.01); *H02K 7/14* (2013.01)

(56) References Cited

U.S. PATENT DOCUMENTS

| 2002/0030414 A1 | 3/2002 | Mizutani et al. |
| 2010/0269770 A1 | 10/2010 | Kokubo et al. |
| 2011/0253085 A1 | 10/2011 | Kokubo et al. |

FOREIGN PATENT DOCUMENTS

| JP | 2004-56894 A | 2/2004 |
| JP | 2008-215121 A | 9/2008 |
| JP | 2010-255543 A | 11/2010 |
| JP | 2011-226372 A | 11/2011 |
| JP | 2013-100832 A | 5/2013 |

* cited by examiner (A)

(B)

(A)

(B)

VALVE TIMING CONTROL DEVICE FOR INTERNAL COMBUSTION ENGINE

TECHNICAL FIELD

The present invention relates to a valve timing control device for an internal combustion engine that variably controls the opening/closing timing of an intake valve and an exhaust valve that are engine valves of the internal combustion engine using an electric motor.

BACKGROUND ART

Recently, a valve timing control device for an internal combustion engine has been provided that transmits the rotational force of an electric motor to a camshaft through a speed reduction mechanism to improve the control responsiveness and controllability of the relative rotational phase of a crankshaft and the camshaft.

For example, a valve timing control device described in the following Patent Literature 1 adopts a DC motor using brushes for a current application switching mechanism of a coil of the motor as an electric motor applied to generation of the rotational force. In the DC motor, a coil is wound around a rotor provided on the outer circumference of a motor shaft, and a permanent magnet is provided on the inner circumferential surface of a motor housing as a stator disposed opposed to the outer circumference of the rotor. It should be noted that a brush provided in a DC motor with a brush is referred to as a "first brush" in the following description. In addition, the motor shaft and the rotor are rotatably supported by bearings such as ball bearings. Further, as means to supply electric power to the DC motor, a mechanism configured using slip rings and a brush (hereinafter, referred to as a "second brush") is used. Specifically, by adopting such a configuration, a camshaft can be rotated relative to a timing sprocket through a speed reduction mechanism by the rotational force of the motor.

Further, a DC motor with a brush to which a noise reduction part is connected is disclosed in the following Patent Literature 2 and Patent Literature 3 although the motor is applied to a fuel pump.

CITATION LIST

Patent Literature

Patent Literature 1: Japanese Unexamined Patent Application Publication No. 2010-255543
Patent Literature 2: Japanese Unexamined Patent Application Publication No. 2008-215121
Patent Literature 3: Japanese Unexamined Patent Application Publication No. Hei 11(1999)-44270

SUMMARY OF INVENTION

Technical Problem

It should be noted that the conventional valve timing control device described in Patent Literature 1 uses the DC motor with a brush. Thus, electromagnetic noise is generated in association with electric discharge between the first brush and a commutator of the motor part in the motor with a brush. Therefore, for example, a choke coil and a capacitor are connected as noise reduction parts, as described in Patent Literatures 2 and 3.

However, the valve timing control device described in Patent Literature 1 uses the mechanism configured using the slip rings and the second brush that supplies electric power to the DC motor as means to supply electric power to the DC motor with a brush, unlike a motor for a fuel pump. Thus, the second brush and a conductor configuring the slip rings that are moved relative to the second brush are slidably contacted with each other. Accordingly, similarly to the electromagnetic noise generated between the first brush and the commutator of the motor part, the electromagnetic noise in association with electric discharge is generated between the second brush and the slip rings. Therefore, the noise reduction parts especially in the valve timing control device to which the present invention relates need to effectively reduce not only the electromagnetic noise generated between the first brush and the commutator of the motor part in association with electric discharge, but also the electromagnetic noise generated between the second brush and the slip rings in association with electric discharge.

It should be noted that when an electronic device is operated, the device itself generates electromagnetic noise as electromagnetic waves in general. Thus, an in-car electronic device needs to minimize the impact of the electromagnetic waves on another device. As a basic method of evaluating such an impact, for example, standards, which should be referred to if necessary, have been published by international organizations ISO, IEC and CISPR.

The present invention needs to solve the above-described problems in the conventional art. Especially in a valve timing control device for an internal combustion engine that variably controls the opening/closing timing of an intake valve and an exhaust valve that are engine valves of the internal combustion engine using an electric motor, it is necessary to suppress the electromagnetic noise between the first brush and the commutator of the motor part and further the electromagnetic noise between the second brush and the slip rings in association with electric discharge from being leaked to the outside of the device. Especially in the above-described valve timing control device for an internal combustion engine, a limited space of an engine room of an automobile needs to be effectively used, and it is important not to needlessly occupy the space. Namely, it is important to keep the volume occupied by the device itself small while effectively suppressing the leakage of the generated electromagnetic noise. Further, since the valve timing control device is a device directly mounted on an engine, it is important to consider not only countermeasures against vibrations of electromagnetic noise emission suppression means as noise reduction parts, but also heat radiation of electronic components configuring the electromagnetic noise emission suppression means because the electronic components are possibly destructed by heat.

Accordingly, the present invention has been made to solve the above-described problems in the conventional art, and an object thereof is to provide, in particular, a valve timing control device for an internal combustion engine that can effectively suppress a leakage of noise to the outside of the device and can improve reliability without needlessly increasing the volume occupied by the device.

Solution to Problem

In order to solve the above-described problems, the present invention adopts, for example, configurations described in claims. Specifically, the present invention provides a valve timing control device for an internal combustion engine, including: a driving rotary body (timing sprocket 111) to which rotational force from a crankshaft of the internal combustion engine is transmitted; a driven rotary body (annular member 114) to which the rotational force is transmitted from the driving rotary body and which is fixed to a camshaft; an intermediate rotary body (motor shaft 118) which is supported by the driven rotary body through a bearing mechanism having at least a ball bearing and which is rotatably provided relative to the driving rotary body; a speed reduction mechanism (117) which reduces the rotational speed of the intermediate rotary body to be transmitted to the driven rotary body by rotating the intermediate rotary body relative to the driving rotary body; an electric motor (103) which is provided to rotate the intermediate rotary body relative to the driving rotary body and which is rotated and driven by a current supplied from the outside; and a housing (115) which is provided integrally with the driving rotary body to store therein the electric motor, wherein: the electric motor rotates relative to the camshaft and also rotates relative to the housing; the valve timing control device further includes a current application switching mechanism (commutator 124) which is provided inside the housing and which includes brushes (304a and 304b) to switch current application to a coil of the electric motor, and feeding mechanisms (springs 309a and 309b) which are provided between the housing and an external device and which include brushes (303a and 303b) to apply a current from the external device to the current application switching mechanism; and electromagnetic noise emission suppression means having an inductive element and a capacitive element is provided on the power supply side of the brushes of the feeding mechanisms.

Advantageous Effects of Invention

According to the valve timing control device for an internal combustion engine of the present invention, it is possible to exert an excellent effect of providing the valve timing control device that can effectively suppress a leakage of noise to the outside of the device and can improve reliability without needlessly increasing the volume occupied by the device.

DESCRIPTION OF EMBODIMENTS

Figure 1:
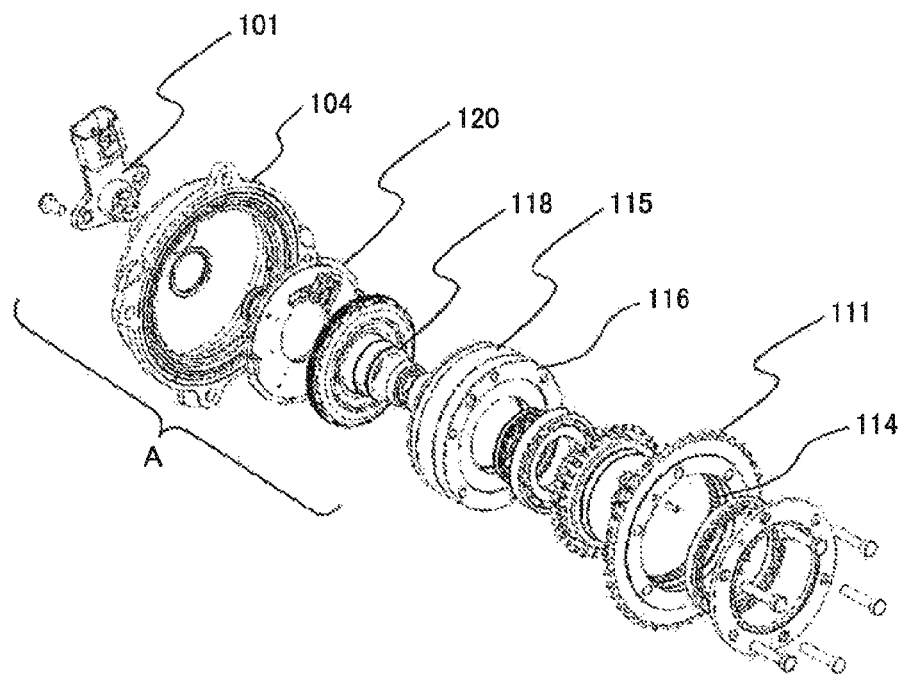
Figs. 1A and 1B are developed perspective views for showing an entire configuration of a valve timing control device for an internal combustion engine according to an embodiment of the present invention and obtained by enlarging a part (section A) thereof.
Figure 1:
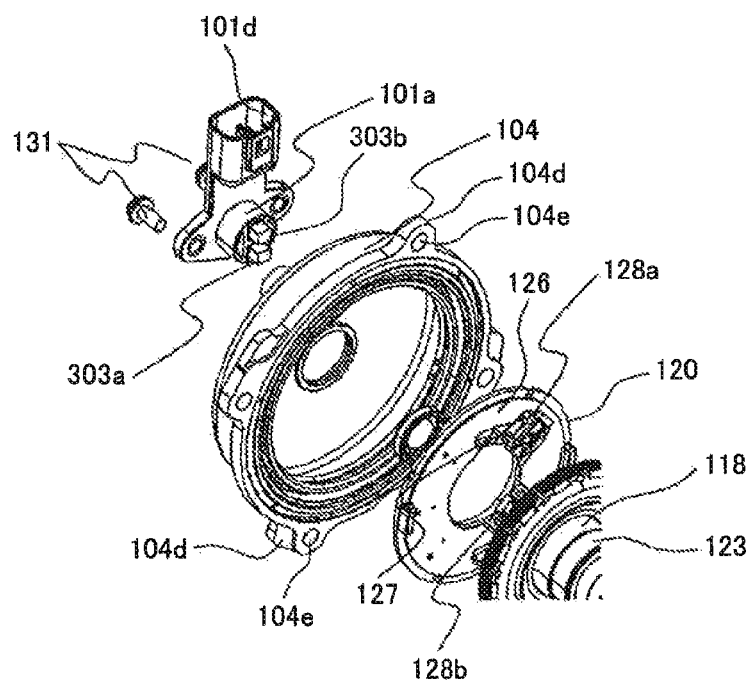

Hereinafter, embodiments of the present invention will be described in detail while referring to the accompanying drawings. It should be noted that the same constitutional elements are hereinafter given the same reference numerals in principle in the drawings for explaining the embodiments of the present invention, and the explanations thereof will be omitted.

First Embodiment

Figure 2:
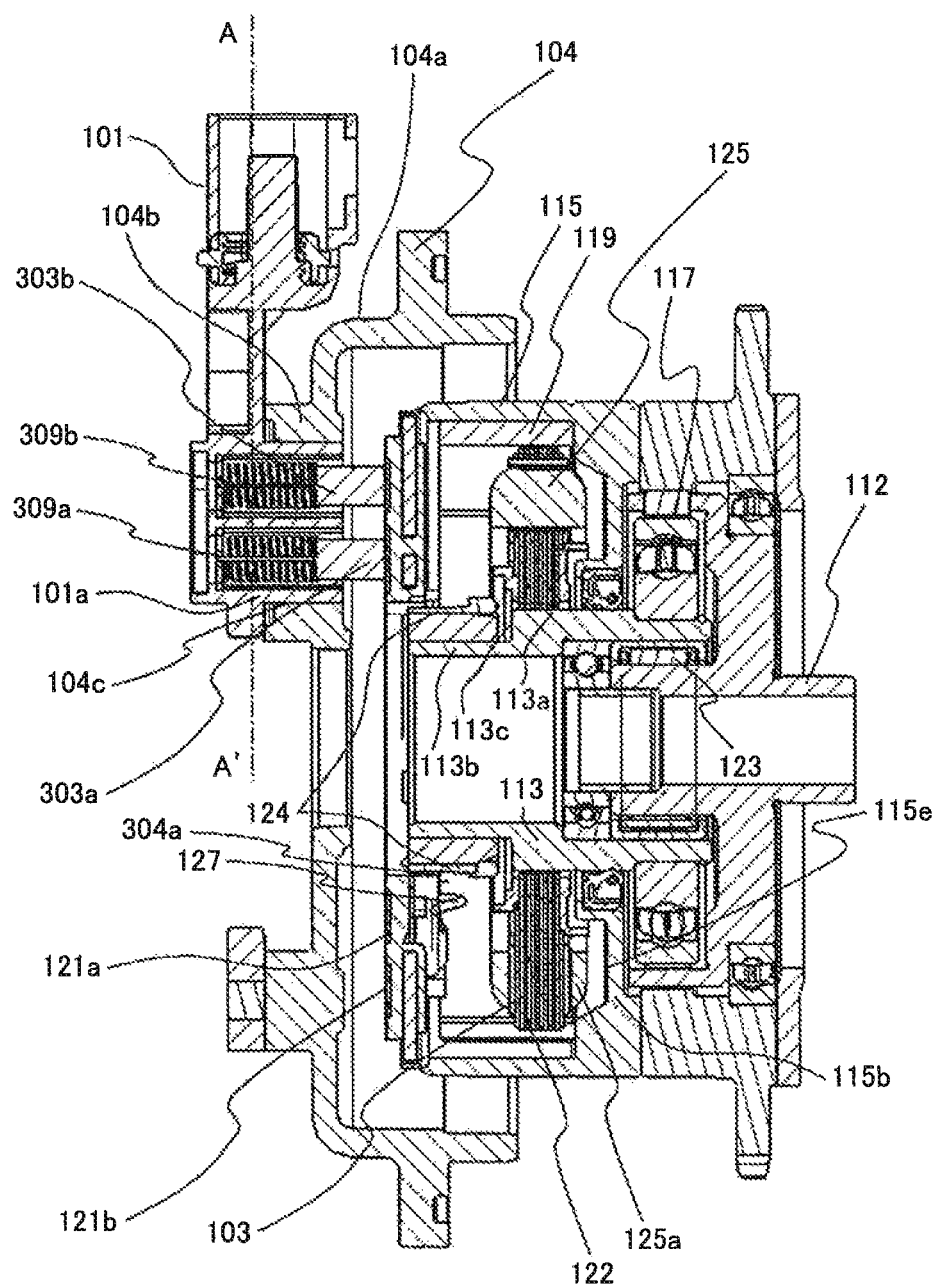
FIG. 2 is a cross-sectional view of the valve timing control device shown in FIGS. 1.

First, an outline of a valve timing control device for an internal combustion engine according to an embodiment of the present invention is shown in the accompanying FIG. 1 (FIG. 1(A) is a developed perspective view of the entire device, and FIG. 1(B) is an enlarged view of a part of the device (the section A of the drawing), and FIG. 2 (partial cross-sectional view) shows the valve timing control device. As shown in these drawings, the valve timing control device includes a timing sprocket 111 as a driving rotary body that is rotated and driven by a crankshaft of the internal combustion engine, a camshaft 112 (FIG. 2) that is rotatably supported through a bearing on a cylinder head (not shown) and is rotated by the rotational force transmitted from the timing sprocket 111, a (case) cover 104 that is disposed at a position ahead of the timing sprocket 111 and is fixed to a chain cover (not shown), and a phase changing mechanism 113 (FIG. 2) that is disposed between the timing sprocket 111 and the camshaft 112 and changes the relative rotational phase of the timing sprocket 111 and the camshaft 112 in accordance with an operation state of the engine.

An annular member 114 (FIG. 1(A)) as a driven rotary body is provided integrally with the timing sprocket 111, and is formed in a cylindrical shape extending in the direction of an electric motor 103 (FIG. 2) of the phase changing mechanism 113. In addition, plural inner teeth are continuously formed at regular intervals in the circumferential direction in the inner circumference. Further, a housing 115 (FIG. 1(A)) of the electric motor 103 and a female screw forming part 116 (FIG. 1(A)) are disposed on the front end side of the annular member 114. Specifically, the sprocket 111 and the annular member 114 are configured as a casing of a speed reduction mechanism 117 (FIG. 2).

For example, the cover 104 is integrally formed of aluminum alloy material in a cup shape, and a swelling part 104a (FIG. 2) formed at a front end part thereof is provided so as to cover a front end part of the housing 115. In addition, a cylindrical wall 104b (FIG. 2) is integrally formed along the axial direction on the outer circumferential side of the swelling part 104a. A holding hole 104c (FIG. 2) is formed inside the cylindrical wall 104b, and the inner circumferential surface of the holding hole 104c is configured as a guide surface of a power supply connector unit 101 (FIG. 1(A)) of the valve timing control device. The power supply connector unit 101 of the valve timing control device is also a holder for second brushes 303a and 303b (FIG. 1(B) and FIG. 2) configuring a feeding structure for the electric motor 103.

Further, four bolt insertion holes 104e penetrate flange parts 104d formed on the outer circumference of the cover 104 (FIG. 1(A)), and the cover 104 is fixed to the chain cover (not shown) using bolts (not shown) inserted into the bolt insertion holes 104e.

The phase changing mechanism 113 is configured using the electric motor 103 that is an actuator disposed on the front end side on substantially the same axis of the camshaft 112, and the speed reduction mechanism 117 that reduces the rotational speed of the electric motor 103 to be transmitted to the camshaft 112.

Figure 3:
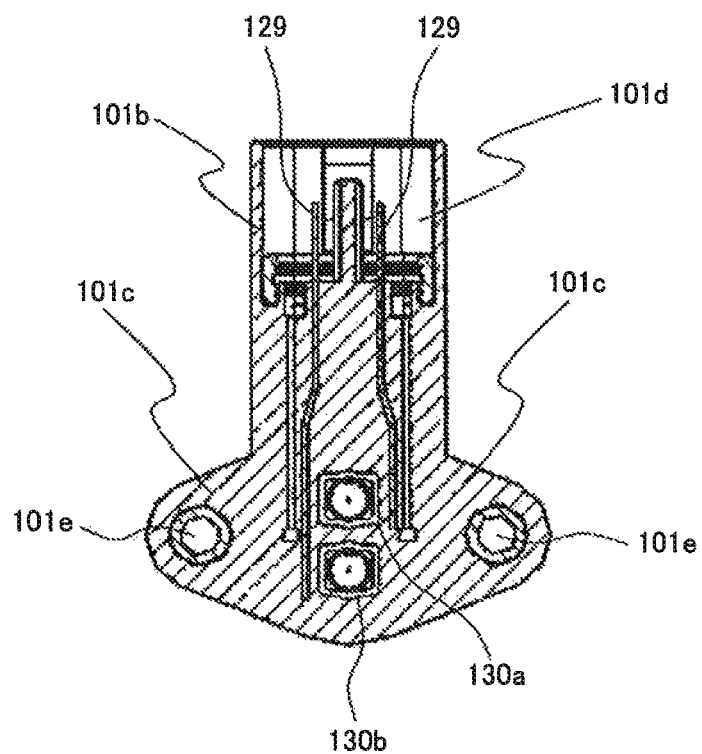
FIG. 3 is a cross-sectional view showing an example of a power supply connector unit in the valve timing control device shown in FIGS. 1.

As shown in the accompanying FIG. 3 together with FIGS. 1(A), 1(B), and FIG. 2, the electric motor 103 is a DC motor with brushes of two stages, and includes the housing 115 (FIG. 1(A)) that is a yoke rotated integrally with the timing sprocket 111, a motor shaft 118 (output shaft) (FIGS. 1(A) and 1(B)) that is an intermediate rotary body rotatably provided inside the housing 115, a semicircular permanent magnet 119 (note that another permanent magnet of a pair is not illustrated) (FIG. 2) that is a stator fixed to the inner circumferential surface of the housing 115, and two inner and outer annular slip rings 121a and 121b (FIG. 2) that are fixed to a sealing plate 120 (FIG. 2) sealing the front end opening of the housing 115 and are embedded and fixed with the outer end surfaces exposed.

As shown in FIG. 2, the motor shaft 113 is formed in a stepped cylindrical shape to function as an armature, and includes a large diameter part 113a on the side of the camshaft 112 and a small diameter part 113b on the side of the power supply connector unit 101 through a stepped part 113c formed at substantially the middle position in the axial direction. Further, an iron-core rotor 122 is fixed to the outer circumference of the large diameter part 113a, an eccentric shaft part 123 is press-fitted and fixed to the inside of the large diameter part 113a from the axial direction, and is positioned in the axial direction by the inner surface of the stepped part 113c. On the other hand, a commutator 124 is press-fitted and fixed to the outer circumference of the small diameter part 113b from the axial direction, and is positioned in the axial direction by the outer surface of the stepped part 113c.

The iron-core rotor 122 is formed of magnetic material having plural magnetic poles, and an electromagnetic coil 125 is wound around a slot formed on the outer circumference thereof. The electromagnetic coil 125 is disposed closer to the housing 115 from the axial direction in such a manner that a coil part 125a on the side of the camshaft 112 is stored in a recessed part 115e in a front end surface of a bottom part 115b of the housing 115.

On the other hand, the electromagnetic coil 125 is electrically connected to the commutator 124 at respective divided segments the number of which is the same as that of magnetic poles of the iron-core rotor 122. In addition, the permanent magnet 119 is formed in a cylindrical shape as a whole, and has plural magnetic poles in the circumferential direction. Further, the position of the permanent magnet 119 in the axial direction is offset forward relative to the fixed position of the iron-core rotor 122.

Specifically, according to the above-described configuration, a front end part of the permanent magnet 119 is disposed while being overlapped with the motor brush (first brush) 304a (304b is not illustrated) and the like connected to the commutator 124 and the slip rings 121a and 121b through a pigtail 129 and a pigtail harness 127 in the radial direction.

A feeding mechanism and a current application switching means mainly include: a disk-like resin plate 126 that is provided integrally with the sealing plate 120 on the inner circumferential side; a pair of brush holders 128a and 128b (FIG. 1(B)) provided inside the resin plate 126; the first brushes 304a and 304b (not shown) as so-called switching brushes that are slidably stored and disposed inside the brush holders 128a and 128b along the radial direction, respectively, and whose tip end surfaces are contacted with the outer circumferential surface of the commutator 124 by spring force from the radial direction; the two inner and outer annular slip rings 121a and 121b that are embedded and fixed on the front end surfaces of the brush holders 128a and 128b (FIG. 1(B)) while the outer end surfaces are exposed; and the pigtail harness 127 that electrically connects the first brushes 304a and 304b (not shown) to the slip rings 121a and 121b, respectively.

It should be noted that the slip rings 121a and 121b configure a part of a feeding mechanism, and further the first brushes 304a and 304b (not shown), the commutator 124, and the pigtail harness 127 configure so-called current application switching means.

Further, the power supply connector unit 101 that is a feeding mechanism integrally molded using synthetic resin material is fixed to the swelling part 104a (FIGS. 1(A) and 1(B)) of the cover 104 in the above-described configuration of the device.

The power supply connector unit 101 is also a holder for the second brushes 303a and 303b, and includes, as shown in the above-described drawings, a substantially cylindrical-shaped brush holding part 101a (FIG. 2) that is formed in nearly an L-shape in a side view and is inserted into the holding hole 104c, a connector part 101b that is mainly formed at an upper end part of the brush holding part 101a as shown in FIG. 3, a pair of bracket parts 101c that integrally protrudes on the both sides of the brush holding part 101a and is fixed to the swelling part 104a, and a pair of terminal pieces 129 the major parts of which are embedded inside the power supply connector unit 101.

The pair of terminal pieces 129 is formed in parallel in a crank shape along the vertical direction, and the terminal of one side (lower end side) is disposed on the bottom part side of the brush holding part 101a while being exposed. On the other hand, the terminal of the other side (upper end side) protrudes inside a female fitting groove 101d of the connector part 101b. Further, the terminal of the other side is electrically connected to a control unit and a battery power supply that are external devices through a male terminal (not shown).

Further, the brush holding part 101a extends in substantially a horizontal direction (axial direction) as shown in FIG. 2, and sleeve-like sliding parts 130a and 130b (FIG. 3) are fixed to cylindrical through-holes formed at upper and lower positions inside the brush holding part 101a. In addition, the second brushes 303a and 303b whose tip end surfaces are brought into contact with the slip rings 121a and 121b from the axial direction, respectively, are held slidably in the axial direction inside the sliding parts 130a and 130b. The outer shape of each of these second brushes 303a and 303b is formed in substantial a rectangular shape. The second brushes 303a and 303b are energized in the direction of the slip rings 121a and 121b by the spring force of springs 309a and 309b that are energizing members provided between the terminal of the one side facing the bottom part side of each through-hole and the second brushes 303a and 303b.

Further, a pair of flexible pigtail harnesses is fixed by welding between rear end parts of the second brushes 303a and 303b and the terminal of the one side, and electrically connects the both. The length of each pigtail harness is set so as not to be dropped from each of the sliding parts 130a and 130b (FIG. 3), namely, is set so as to regulate the maximum sliding position even when the second brushes 303a and 303b are maximally moved by the springs 309a and 309b.

The terminal of the other side of the connector part 101b into the upper end part of which a male terminal (not shown)

is inserted and which faces the fitting groove 101d is electrically connected to a control unit and a battery power supply (not shown) through the male terminal.

Each of the bracket parts 101c is formed in substantially a triangular shape, and bolt insertion holes 101e penetrate the both sides (FIG. 3). Bolts 131 screwed to a pair of female screw holes (not shown) formed at the swelling part 104a of the cover 104 are inserted into the respective bolt insertion holes 101e. Thus, the power supply connector unit 101 is fixed to the swelling part 104a of the cover 104 through each bracket part 101c.

On the basis of the standards published by international organizations TEC and CISPR, the inventors of the application especially examined and studied a cause of electromagnetic noise emission generated when a battery power supply was electrically connected to the power supply connector unit 101 through a male terminal and an electronic control unit (not shown) to drive the electric valve timing control device having the above-described configuration. The result will be described below.

Specifically, the electromagnetic noise emission was generated from the following locations:

(1) between the first brushes 304a and 304b (not shown) and the commutator 124; and (2) between the second brushes 303a and 303b configuring a feeding structure for the electric motor 103 and the two inner and outer annular slip rings 121a and 121b that were embedded and fixed to the disk-like resin plate 126 provided integrally with the inner circumferential side of the sealing plate 120 while the outer end surfaces were exposed. The inventors found that the most of the electromagnetic noise emission was generated from the above-described locations in the electric valve timing control device.

Figure 4:
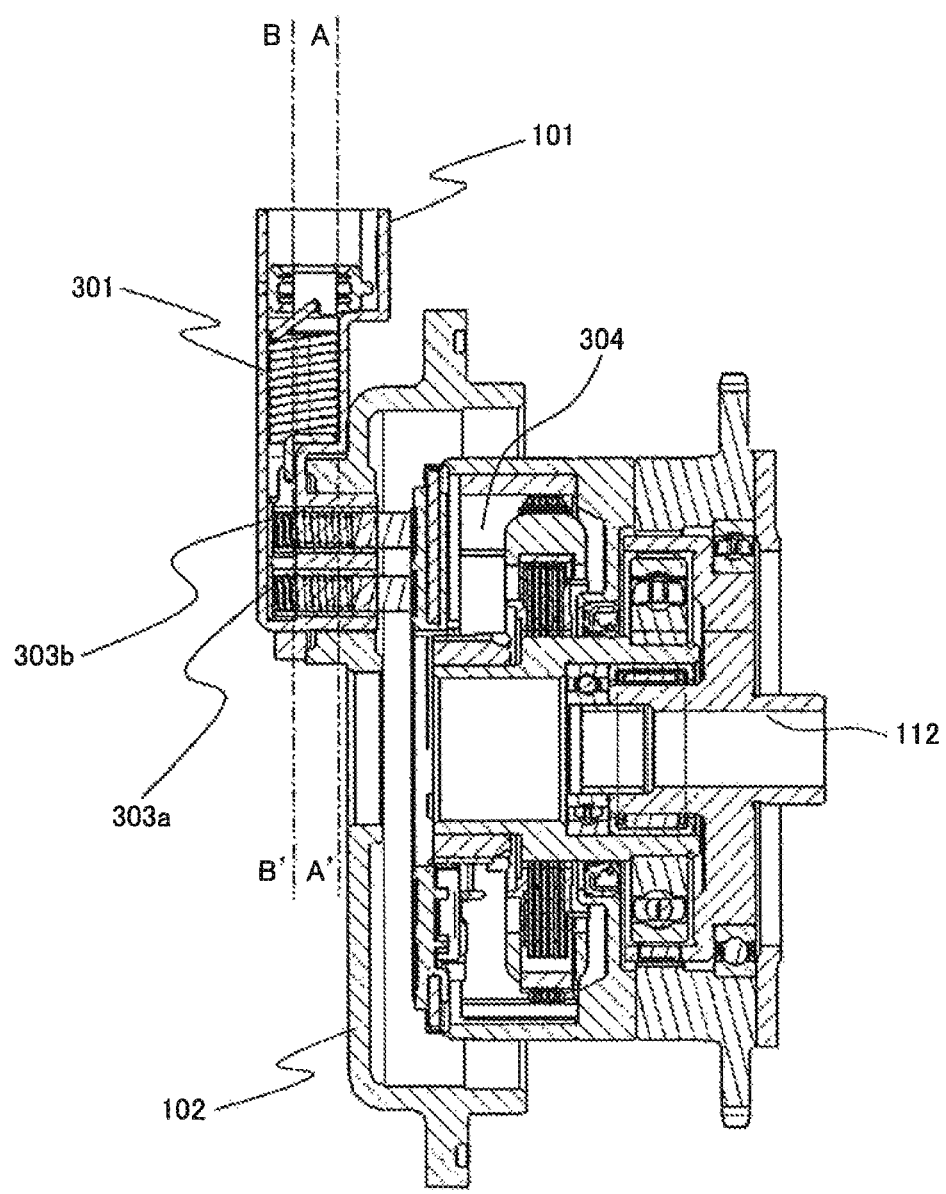
FIG. 4 is a cross-sectional view showing an example of the valve timing control device with noise suppression elements shown in FIGS. 1.
Figure 5:
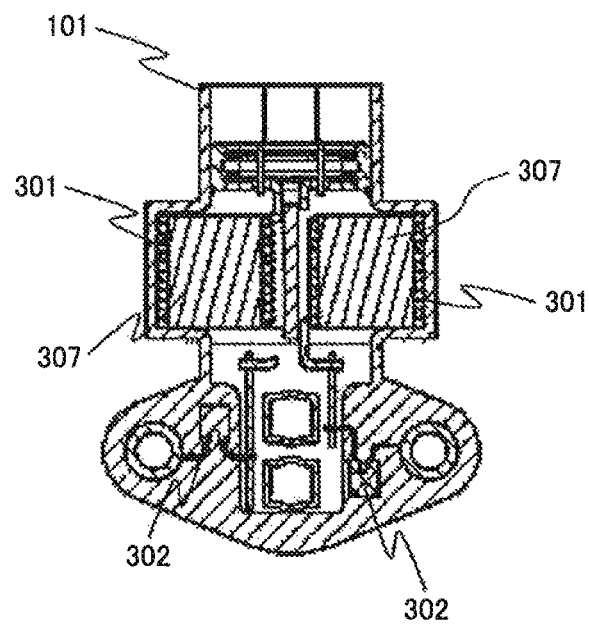
FIGS. 5A and 5B are cross-sectional views taken along the lines A-A' and B-B' of the valve timing control device shown in FIG. 4.
Figure 5:
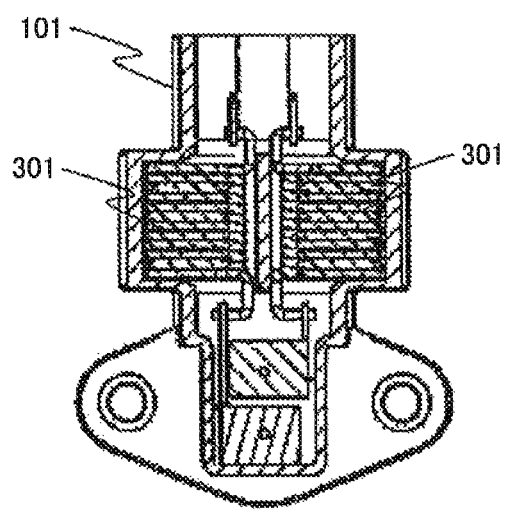

Accordingly, electromagnetic noise emission suppression means to suppress the electromagnetic noise emission generated from the above-described two locations was provided on the power supply side of the second brushes 303a and 303b in the present invention, especially, in the above-described embodiment. More specifically, as the electromagnetic noise emission suppression means, only one inductive element (coil) 301 and only one capacitive element (capacitor) 302 were used as shown in FIG. 4 and FIG. 5, namely, a simple configuration configured using a pair was employed in the embodiment. It should be noted that the present invention is not limited to the above-described configuration. For example, the electromagnetic noise emission suppression means can be formed using two or more elements for each, or other kinds of elements.

Further, according to the result of the above-described examination and study, the inventors also found that the electromagnetic noise emission suppression means disposed in the electronic control unit was not effective in the suppression of the electromagnetic noise emission even in the power supply connector unit 101. The electromagnetic noise emission suppression means installed near the position where the electromagnetic noise was generated was most effective in the suppression of the electromagnetic noise emission. This means that an electric loop area configured using parts generating the electromagnetic noise and the electromagnetic noise emission suppression means is minimized. Thus, the electromagnetic noise emission suppression means installed near each of the parts generating the electromagnetic noise is most effective in the suppression of the electromagnetic noise emission. It should be noted that a magnetic body core 307 is provided in the middle of the inductive element (coil) 301 in the embodiment.

However, in consideration of not only the above-described effect of the electromagnetic noise emission suppression, but also, in particular, the characteristics of the valve timing control device for an internal combustion engine to which the present invention relates, namely, in consideration of effectively using a limited space of an engine room of an automobile without needlessly occupying the space, it is preferable that the number of elements is minimized and the elements are aggregated in the power supply connector unit. In order to realize this, the inventors found that the following is preferable: the locations (1) and (2) of the sources of the electromagnetic noise emission are disposed close to each other and thus the electromagnetic noise generated from the both sources of the electromagnetic noise emission is suppressed by the electromagnetic noise emission suppression means of a minimum one-stage configuration.

As a result, in order to dispose the locations (1) and (2) of the sources of the electromagnetic noise emission close to each other in the first place, especially, the current application switching mechanism of the coil was configured using the brushes in the embodiment, and the brush (second brush) supplying a current from the outside and the brush (first brush) of the current application switching mechanism of the coil were disposed apart from the rotational axis of the device (camshaft) by substantially the same distance.

Next, in order to aggregate necessary elements in the power supply connector unit 101, as shown in FIG. 4, electrodes, the inductive elements (coils) 301, and connector terminals were disposed in this order towards the outside in the radial direction of the electric valve timing control device and were connected to the brushes between two lines connecting both electrode terminals embedded in the power supply connector unit 101 to the connector terminals, and the capacitive elements (capacitors) 302 were disposed in the circumferential direction on the both sides of the electrodes. Accordingly, the elements could be aggregated in the power supply connector unit 101.

Further, the inductive elements (coils) 301 were, as shown in FIGS. 5(A) and 5(B), disposed in series to the electrodes, and the capacitive elements (capacitors) 302 were disposed in parallel with the electrodes between screw holes for attaching the power supply connector unit 101. The terminals opposite to those connected to the electrodes of the capacitive elements 302 were connected between the screw holes for attaching the power supply connector unit 101, and the four bolt insertion holes 104e were formed while penetrating the flange parts 104d formed at the outer circumference through the cover 104 to be fixed to the chain cover (not shown) through bolts (not shown) inserted into the respective bolt insertion holes 104e. Accordingly, the obtained unit could be electrically connected to the ground (housing ground) of the engine.

Figure 6:
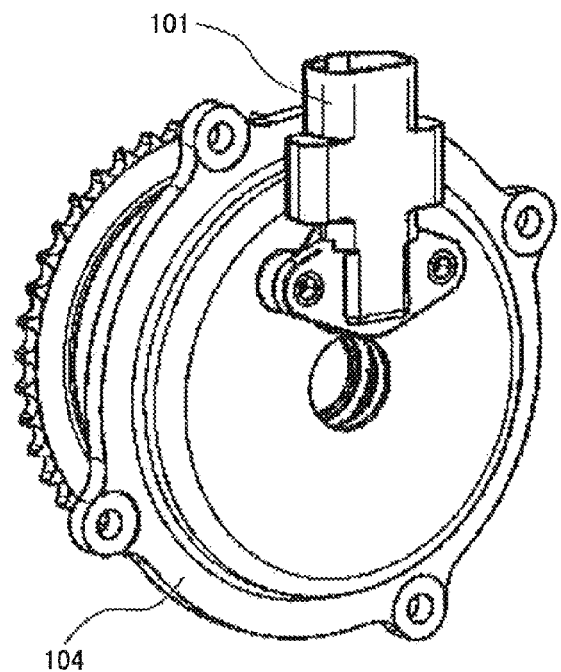
FIG. 6 is a perspective view for showing an external shape of the valve timing control device.

Further, the accompanying FIG. 6 shows an outline view of the electric valve timing control device provided with the above-described electromagnetic noise emission suppression means. Specifically, as compared to a conventional electric valve timing control device, a volume corresponding to nearly one inductive element (coil) 301 was increased in the middle of the power supply connector unit 101 where the inductive elements (coils) 301 were installed. However, it is obvious that the electromagnetic noise emission suppression means could be provided while keeping the compactness of the whole device.

Further, the power supply connector unit 101 was electrically connected to a battery power supply through a male terminal and an electronic control unit (not shown) in the electric valve timing control device provided with the above-described electromagnetic noise emission suppression means, and the electromagnetic noise emission during driving was measured as similar to the above on the basis of the standards published by international organizations IEC and CISPR. The inventors found that the maximum electromagnetic noise emission of 13 dB (μV/m) could be suppressed as compared to the electromagnetic noise emission suppression means.

Specifically, according to the above-described first embodiment of the present invention, plural sources of electromagnetic noise emission are disposed close to each other, and the electromagnetic noise emission suppression means is installed in high density. Thus, the electromagnetic noise emission can be effectively suppressed. Further, the elements configuring the electromagnetic noise emission suppression means are fixed, and thus the reliability of the valve timing control device for an internal combustion engine can be improved at a low cost. Further, the electromagnetic noise emission suppression means is aggregated in the electronic control unit, and thus a module design can be realized while keeping the compactness of the whole device as the valve timing control device for an internal combustion engine. In addition, manufacturing work and assembly work can be simplified, and further product management can be simplified.

Second Embodiment

Figure 7:
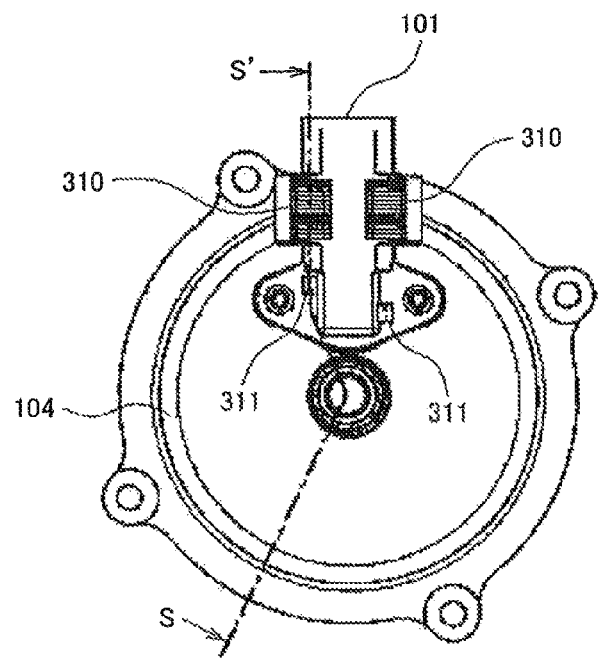
FIG. 7 is a front outline view of a valve timing control device for an internal combustion engine according to another embodiment of the present invention.
Figure 8:
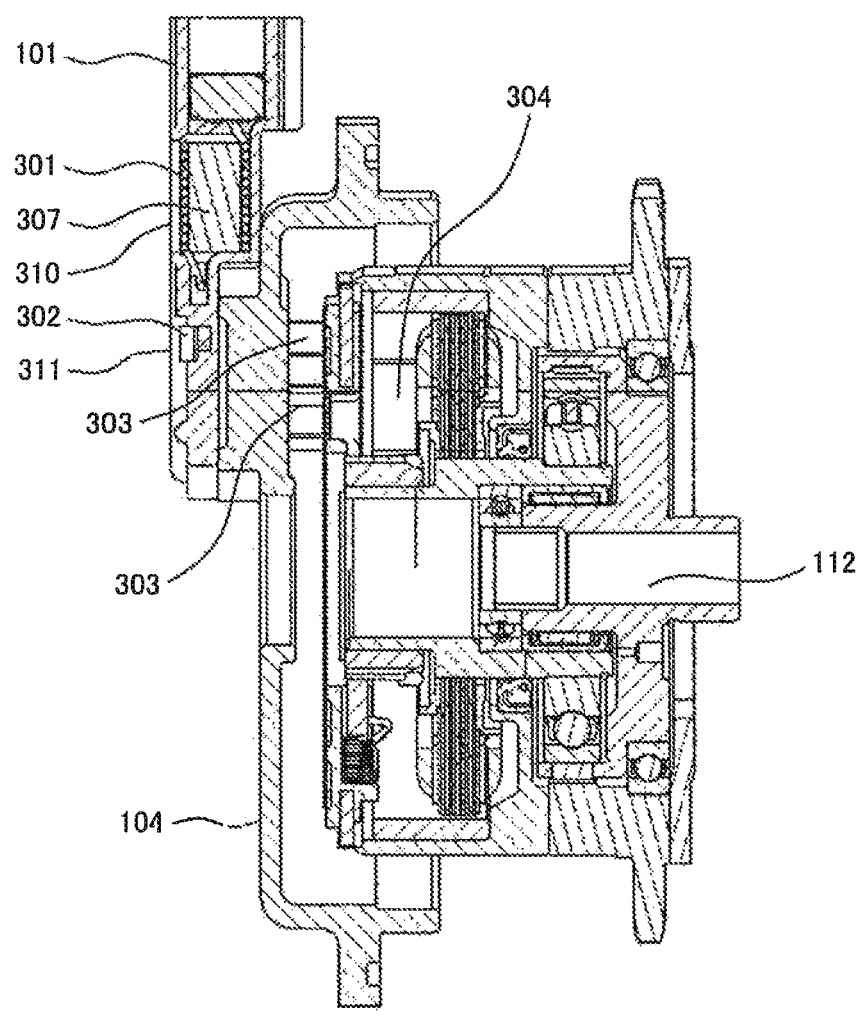
FIG. 8 is a cross-sectional view taken along the line S-S' of the valve timing control device shown in FIG. 7.

Next, a valve timing control device for an internal combustion engine according to another embodiment (second embodiment) of the present invention will be described below in detail while referring to the accompanying FIG. 7 and FIG. 8. It should be noted that FIG. 7 is a front outline view of the (housing) cover 104 including the power supply connector unit 101. Further, FIG. 8 is a cross-sectional view taken along the line S-S' of FIG. 7.

The valve timing control device is a device that is directly mounted to an engine. Therefore, it is important to consider a countermeasure against vibrations from the engine for the electromagnetic noise emission suppression means, and further it is important to consider heat radiation of electronic components configuring the electromagnetic noise emission suppression means because the valve timing control device is disposed in an engine room that is a limited space of an automobile.

It should be noted that the power supply connector unit 101 is configured in such a manner that the inductive elements (coils) 301 and the capacitive elements (capacitors) 302 are completely covered with resin in the first embodiment. In particular, the inductive elements (coils) 301 are disposed in series to electrodes. Thus, a current having a high current value flows as similar to that flowing in the motor. Thus, the amount of generation of Joule heat is large. In spite of this, the heat is likely to be accumulated in the elements because the elements are covered with resin. Thus, there is a concern about deterioration in characteristics of the elements due to the heat.

Accordingly, the elements are fixed using resin, and windows are provided at the resin of the element parts in order to increase heat radiation of the elements in the embodiment. More specifically, as shown in FIG. 7 and FIG. 8, windows 310 are attached to the inductive element parts, and further windows 311 are similarly attached to the capacitor element parts. It should be noted that the windows in a rectangular shape are exemplified as similar to the outer shape of each element in the embodiment. However, the present invention is not limited to the rectangular shape. Alternatively, the windows can be divided into a mesh or slit shape.

Specifically, according to the embodiment, plural sources of electromagnetic noise emission are disposed close to each other, and the electromagnetic noise emission suppression means is installed in high density. Thus, the electromagnetic noise emission can be effectively suppressed. Further, the elements configuring the electromagnetic noise emission suppression means are fixed, and the heat radiation of the elements can be improved. Thus, the reliability of the valve timing control device for an internal combustion engine can be improved at a low cost. In addition, the electromagnetic noise emission suppression means is aggregated in the electronic control unit, and thus a module design can be realized while keeping the compactness of the whole device. Moreover, manufacturing work and assembly work can be simplified, and further product management can be simplified.

The present invention has been described above in detail according to the embodiments. However, the present invention is not limited to the above-described configurations of the embodiments. For example, the permanent magnet 119 is used as a stator, but a stator of another kind can be used. Further, a brushless DC motor using a semiconductor may be used. However, the cost of the brushless DC motor is higher than that of the motor with brushes shown in the configurations of the embodiments. Further, in the case of the brushless DC motor, switching control using a semiconductor is performed, and thus the power use efficiency is lowered as compared to the motor with brushes.

Further, according to the above-described valve timing control device for an internal combustion engine of the present invention, a leakage of noise to the outside of the valve timing control device for an internal combustion engine can be suppressed, and an impact on the other devices can be suppressed.

Specifically, it is generally necessary to dispose two electromagnetic noise emission suppression means in total at the current application switching mechanism of the coil of the motor and the brush configuring the feeding means from the outside. However, the brush, the current application switching mechanism of the coil, and the electromagnetic noise emission suppression means are disposed close to each other. Especially, the brush that supplies a current from the outside and the current application switching mechanism of the coil are disposed close to each other, and further are disposed apart from the rotational axis by substantially the same distance. Accordingly, only one electromagnetic noise emission suppression means needs to be installed, and the number of parts can be reduced. Further, the electromagnetic noise emission suppression means is aggregated in the power supply connector unit of the valve timing control device, and thus it is possible to easily respond to changes in manufacturing and assembling processes of the valve timing control device.

Further, the electromagnetic noise emission suppression means is molded and fixed using resin. Accordingly, problems due to vibrations can be solved. Furthermore, the electronic components configuring the electromagnetic noise emission suppression means are partially molded using resin. Accordingly, the heat radiation effect can be enhanced. Specifically, the reliability of the valve timing control device for an internal combustion engine can be improved.

LIST OF REFERENCE SIGNS

104 . . . cover, 111 . . . timing sprocket, 112 . . . camshaft, 113 . . . phase changing mechanism, 114 . . . annular member, 115 . . . housing, 116 . . . female screw forming part, 117 . . . speed reduction mechanism, 118 . . . motor shaft, 119 . . . permanent magnet, 120 . . . sealing plate, 121 . . . slip ring, 122 . . . iron-core rotor, 123 . . . eccentric shaft part, 124 . . . commutator, 125 . . . electromagnetic coil, 126 . . . resin plate, 127 . . . pigtail harness, 128 . . . resin holder, 129 . . . terminal piece, 130 . . . sleeve-like sliding part, 131 . . . bolt, 301 . . . inductive element, 302 . . . capacitive element, 303 . . . second brush, 304 . . . first brush, 309 . . . second spring, 310, 311 . . . window

The invention claimed is:

1. A valve timing control device for an internal combustion engine, comprising:
   a driving rotary body to which rotational force from a crankshaft of the internal combustion engine is transmitted;
   a driven rotary body to which the rotational force is transmitted from the driving rotary body and which is fixed to a camshaft;
   an intermediate rotary body which is supported by the driven rotary body through a bearing mechanism having at least a ball bearing and which is rotatably provided relative to the driving rotary body;
   a speed reduction mechanism which reduces the rotational speed of the intermediate rotary body to be transmitted to the driven rotary body by rotating the intermediate rotary body relative to the driving rotary body;
   an electric motor which is provided to rotate the intermediate rotary body relative to the driving rotary body and which is rotated and driven by a current supplied from the outside via a power connector unit; and
   a housing which is provided integrally with the driving rotary body to store therein the electric motor, wherein
   the electric motor rotates relative to the camshaft and also rotates relative to the housing;
   the valve timing control device further comprises a current application switching mechanism which is provided inside the housing and which includes brushes to switch current application to a coil of the electric motor, and feeding mechanisms which are provided between the housing and an external device and which include brushes to apply a current from the external device to the current application switching mechanism;
   electromagnetic noise emission suppression means having: i) an inductive element that is operatively coupled to both the current application switching mechanism and to the feeding mechanisms, and ii) a capacitive element that is provided on the power supply side of the brushes of the feeding mechanisms;
   a valve timing controller that is operatively coupled to the power connector unit.

2. The valve timing control device for an internal combustion engine according to claim 1, wherein the current application switching mechanism and the electromagnetic noise emission suppression means are disposed close to each other.

3. The valve timing control device for an internal combustion engine according to claim 1, wherein the brushes of the current application switching mechanism and the brushes of the feeding mechanisms are disposed apart from the rotational axis of the camshaft by substantially the same distance.

4. The valve timing control device for an internal combustion engine according to claim 2, wherein the inductive element configuring the electromagnetic noise emission suppression means is connected in series to a power source line and the capacitive element is connected between the power source line and a housing ground.

5. The valve timing control device for an internal combustion engine according to claim 4, wherein the entirety or a part of the inductive element and the capacitive element exists outside a metal case.

6. The valve timing control device for an internal combustion engine according to claim 4, wherein the inductive element and the capacitive element are molded using resin.

7. The valve timing control device for an internal combustion engine according to claim 4, wherein a part of the inductive element is molded using resin.

8. The valve timing control device for an internal combustion engine according to claim 4, wherein a part of the capacitive element is molded using resin.

* * * * *